Sept. 18, 1928.                F. G. JOHNSON                1,685,028
                                ANIMAL TRAP
                             Filed Jan. 23, 1928
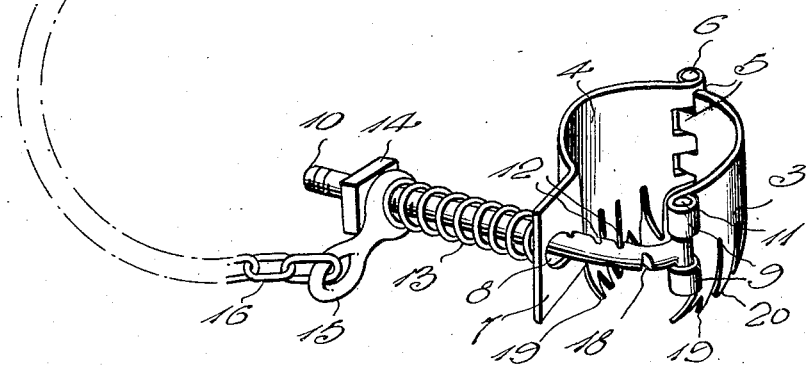
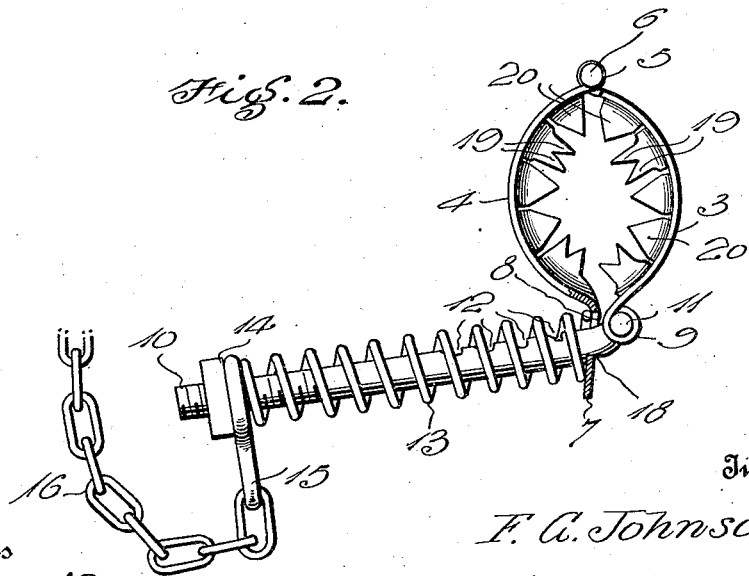
Inventor
F. G. Johnson Patented Sept. 18, 1928.

1,685,028

UNITED STATES PATENT OFFICE.

FELIX G. JOHNSON, OF CLARINDA, IOWA.

ANIMAL TRAP.

Application filed January 23, 1928. Serial No. 248,802.

The invention aims to provide a simple and inexpensive, yet an efficient trap for catching an animal by one of his fore paws and holding him in a comparatively humane manner until arrival of the trapper, and in carrying out this end, it is a further object to provide the jaws of the trap with a plurality of short-pointed teeth and with a plurality of long-pointed teeth, the short-pointed teeth serving to prevent excessive penetration by the long-pointed teeth unless the animal jerks forcibly upon the trap, whereupon all teeth penetrate the flesh.

With the foregoing in view, the invention resides in the novel subject matter hereinafter described and claimed, description being accomplished by reference to the accompanying drawing.

Fig. 1 is a perspective view with the trap set.

Fig. 2 is a top plan view partly in horizontal section showing the jaws of the trap closed.

The form of construction selected for illustration in the present application, may be considered as preferred, and while this construction will be herein specifically explained, it is to be understood that within the scope of the invention as claimed, variations may be made.

The numerals 3 and 4 on the drawing denote two arcuate jaws having alined hinge knuckles 5 at one end, through which a pintle 6 passes to pivotally connect said jaws. The other end of jaw 4 is provided with an eye preferably provided by radially extending said end as at 7 and forming it with an opening 8. The corresponding end of the jaw 3 is provided with a pair of spaced knuckles 9. A rod 10 passes slidably through the opening 8 and is provided with trunnions 11 which are pivotally received in the knuckles 9. The inner side of this rod 10 is provided with a plurality of teeth 12, any of which may be engaged with the eye 8 to hold the jaws 3—4 in open position, against the action of a coiled compression spring 13. This spring surrounds the rod 10, one of its ends bears against the eye 8 and a nut 14 threaded on said rod, resists movement of the spring in the other direction and serves as means for adjusting the strength of said spring. A special end link 15 on an anchor chain 16, is shown surrounding the rod 10 between the spring 13 and the nut 14, the end of this chain remote from said link 15 being provided with a stake 17 or with other desired anchoring means.

The outer side of rod 10 is provided, near the pivoted end of said rod, with a tooth 18 to engage the eye 8 when the jaws are closed as shown in Fig. 2, thus holding them against being pried open by the entrapped animal.

In setting the trap, a hole is preferably formed in the ground, simulating a crawfish hole, bait is placed in this hole and the trap is set at the upper end of said hole. Any animal endeavoring to obtain the bait will reach down the hole with one of his fore paws and in endeavoring to withdraw the bait, will disengage the eye 8 from the rod 10, whereupon spring 13 immediately comes into play to close the jaws. The lower edges of these jaws are provided with teeth which prevent withdrawal of the animal's paw and hence he is securely entrapped, though in a comparatively humane manner, unless he jerks excessively upon the trap. The teeth just referred to are preferably of the character described below.

The lower edge of each jaw 3—4 is provided with a plurality of short-pointed teeth 19 preferably disposed in pairs as shown, and with a plurality of long-pointed teeth 20. All of these teeth slant inwardly and upon closing of the trap, they all engage the entrapped animal's paw. The short-pointed teeth 19 however, only penetrate to a slight extent and prevent the long-pointed teeth from penetrating excessively, unless the animal jerks forcibly upon the trap. If this is done, all of the teeth 19—20 of course penetrate to the maximum to prevent the prey from escaping.

I have above stated that within the scope of the invention as claimed, variations may be made and it will of course be obvious that the trap may be constructed of any size, according to the species of animal to be caught. For instance, with about the same construction, a bear trap or a rat trap could be formed, the primary distinction being size only.

I claim:—

1. A trap comprising two arcuate jaws pivoted together at one end, the other end of one jaw being provided with an eye, a rod pivotally connected to the other end of the other jaw and passing slidably through said eye, said rod having means to engage said eye and hold the jaws open, and spring means for closing said jaws upon release of said holding means.

2. A trap comprising two arcuate jaws pivoted together at one end, the other end of one jaw being provided with an eye, a rod pivotally connected to the other end of the other jaw and passing slidably through said eye, said rod having means to engage said eye and hold the jaws open, a coiled compression spring surrounding said rod and bearing against said eye to close the jaws upon release of said holding means, and stationary means on said rod against which said spring abuts.

3. A trap comprising two arcuate jaws pivoted together at one end, the other end of one jaw being provided with an eye, a rod pivotally connected to the other end of the other jaw and passing slidably through said eye, said rod having a tooth to engage said eye and hold the jaws open, and spring means for closing said jaws upon release of said holding means.

4. A trap comprising two arcuate jaws pivoted together at one end, the other end of one jaw being provided with an eye, a rod pivotally connected to the other end of the other jaw and passing slidably through said eye, said rod having a tooth to engage said eye and hold the jaws open, a coiled compression spring surrounding said rod and bearing against said eye to close the jaws upon release of said holding means, and stationary means on said rod against which said spring abuts.

5. A structure as specified in claim 1; together with means on said rod adjacent its pivoted end for engagement with said eye to hold the jaws closed.

6. A structure as specified in claim 3; together with an additional tooth on said rod adjacent its pivoted end for engagement with said eye to hold the jaws closed.

In testimony whereof I have hereunto affixed my signature.

FELIX G. JOHNSON.